Aug. 19, 1969  
C. J. GEURTS  
3,461,973  
YIELDING PLOW BOTTOM  
Filed Aug. 17, 1967  
2 Sheets-Sheet 1
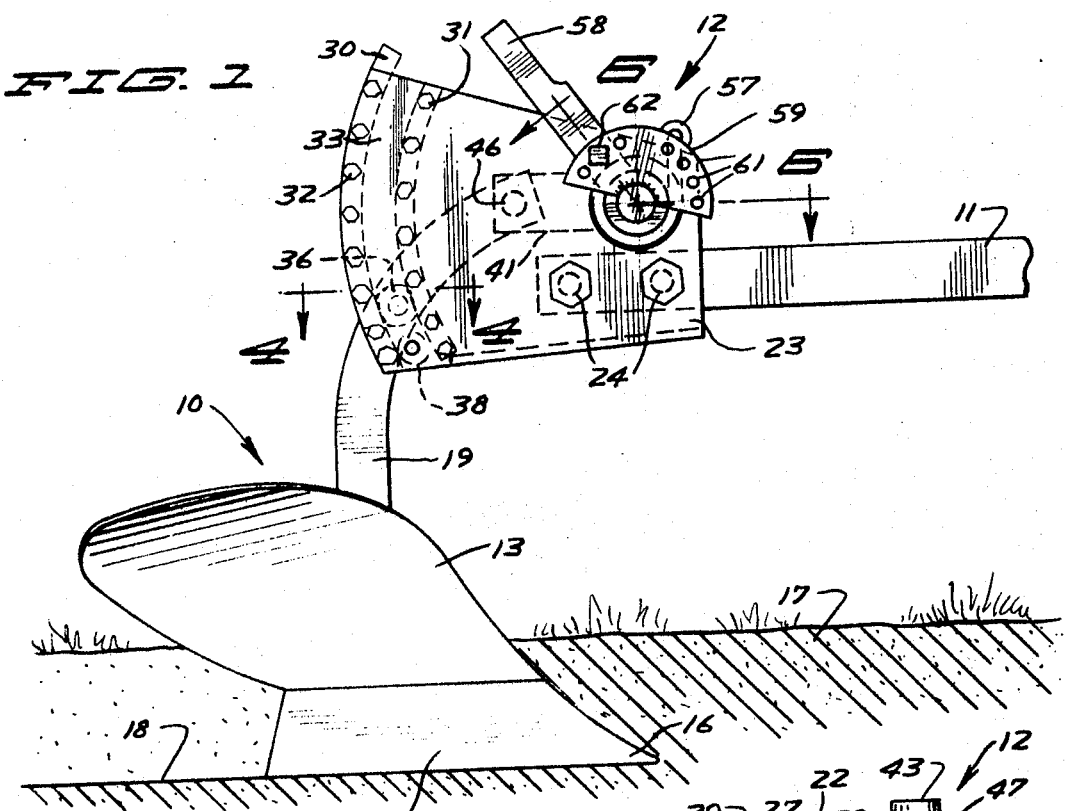
FIG. 1
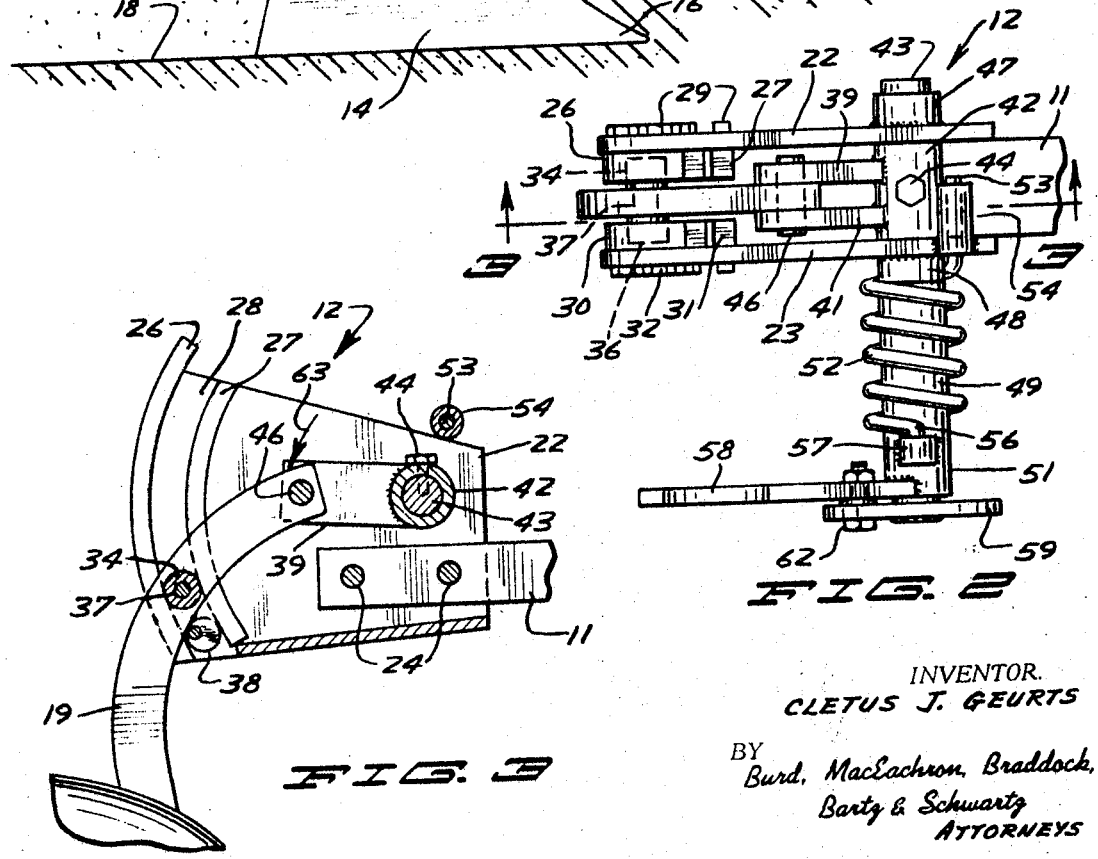
FIG. 2
FIG. 3
INVENTOR.  
CLETUS J. GEURTS  
BY  
Burd, MacEachron, Braddock,  
Bartz & Schwartz  
ATTORNEYS Aug. 19, 1969  C. J. GEURTS  3,461,973
YIELDING PLOW BOTTOM
Filed Aug. 17, 1967  2 Sheets-Sheet 2
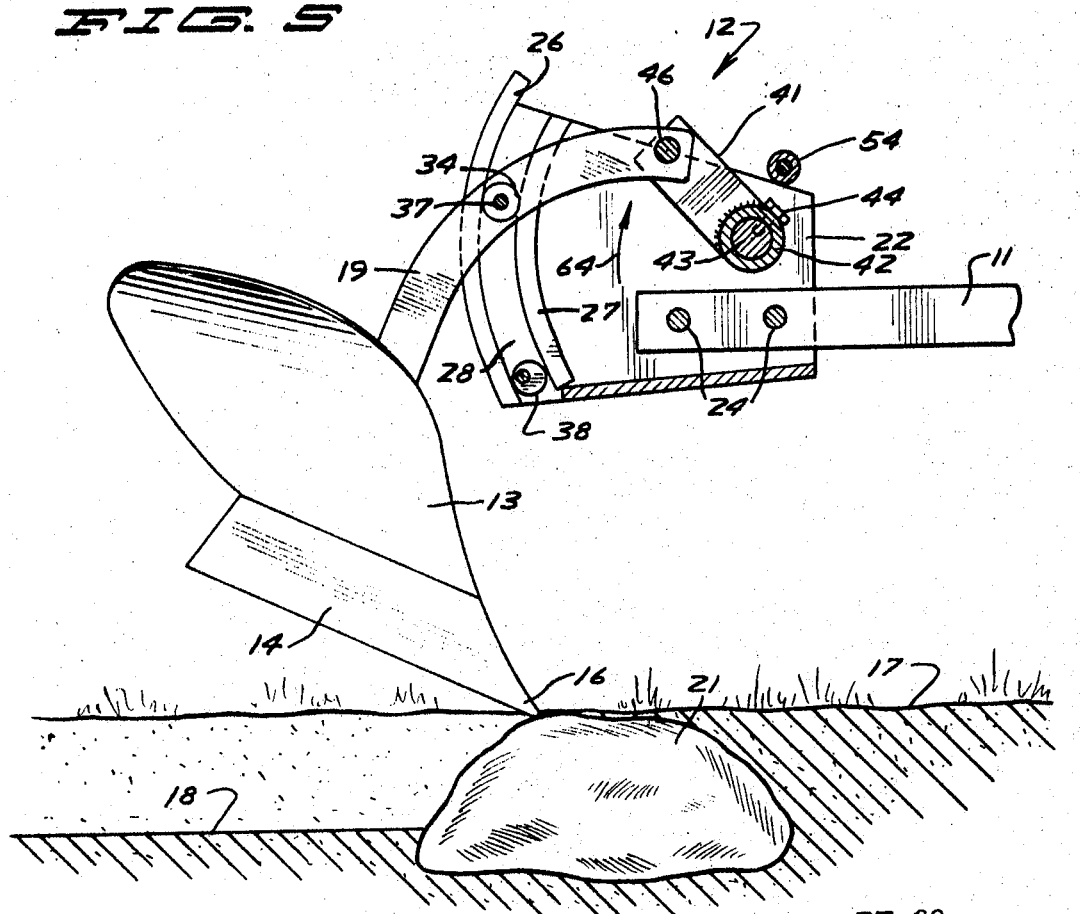
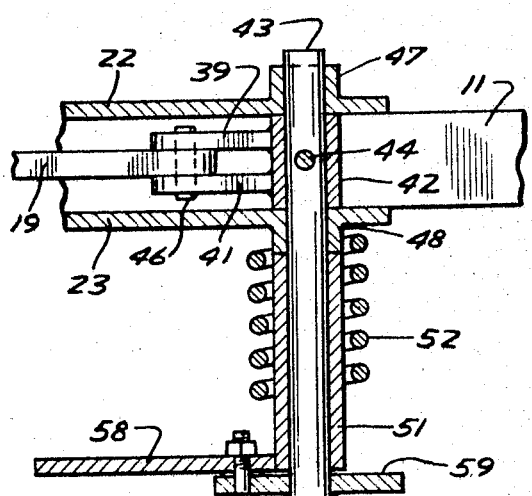
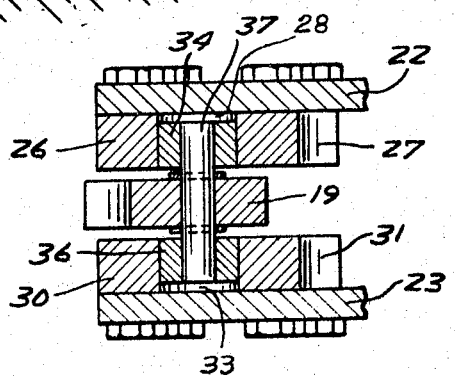
INVENTOR.
CLETUS J. GEURTS
BY
Burd, MacEachron, Braddock,
Bartz & Schwartz
ATTORNEYS United States Patent Office 3,461,973
Patented Aug. 19, 1969

3,461,973
YIELDING PLOW BOTTOM
Cletus J. Geurts, Box 42, Gwinner, N. Dak. 58040
Continuation-in-part of application Ser. No. 486,712,
Sept. 13, 1965. This application Aug. 17, 1967, Ser.
No. 661,301
Int. Cl. A01b 61/04, 15/02
U.S. Cl. 172—264                       11 Claims

ABSTRACT OF THE DISCLOSURE

A plow bottom connected to a beam with a combined guide, holding and release assembly for yieldably holding the plow bottom in the ground working position. The guide of the assembly comprises two pair of upwardly curved tracks forming spaced guideways for rollers mounted on opposite sides of the plow standard for controlling the movement of the plow bottom so that the point of the plow share does not go below the furrow bottom when clearing an obstruction. The upper end of the standard is connected to a crank arm biased by a torsion spring to hold the plow bottom in the ground working position.

Cross reference to related application

This application is a continuation-in-part of application Ser. No. 486,712, filed Sept. 13, 1965.

Background of invention

The invention pertains to an earth working implement in combination with a biasing control for automatically guiding, holding and releasing the earth working tool when it strikes an obstruction. The prior art tripping devices for earth working tools, as moldboard plows, allow the tool to swing backward and upward when the tool strikes an obstruction enabling the tool to clear the obstruction.

The combined guide, holding and releasing assembly in the present invention controls the movement of an earth working tool, as a plow bottom, out of the ground so that when it strikes an obstruction the point of the tool does not go below the working depth. The tool is automatically returned to its normal ground working position by the force of a torsion spring on clearing the obstruction. The tripping and resetting of a plow bottom is accomplished without stopping the forward motion of the plow. The tripping of one or more of the plow bottoms of a plow having the combined guide, holding and release assembly does not interfere with the operation of the other plow bottoms of the plow.

Summary of invention

The invention relates to a combined guide, holding and release assembly for a standard carrying an earth working tool. The assembly has guide means cooperating with the standard for directing the movement of the standard upwardly away from a stop without allowing the earth working tool to go below the working depth of the tool. An arm means pivotally connected to the upper end of the standard is biased in a downward direction yieldably holding the standard in engagement with the stop. When the ground working tool strikes an obstruction the standard is moved in an upward direction determined by the guide means forcing the arm means upwardly against the force of a biasing means acting on the arm means until the earth working tool clears the obstruction. The biasing means then automatically turns the earth working tool to its normal earth working position.

In the drawings:
FIGURE 1 is a side elevational view of a plow bottom in ground working position attached to a beam with the combined guide, holding and release assembly of the invention;
FIGURE 2 is a plan view of the guide, holding and release assembly of FIGURE 1;
FIGURE 3 is a sectional view taken along the line 3—3 of FIGURE 2;
FIGURE 4 is a sectional view taken along the line 4—4 of FIGURE 1;
FIGURE 5 is a sectional view similar to FIGURE 3 showing the plow bottom moving over a rock; and
FIGURE 6 is an enlarged sectional view taken along the line 6—6 of FIGURE 1.

Referring to the drawings, there is shown in FIGURE 1, plow bottom 10 attached to a horizontal beam 11 by the combined guide, holding and release assembly indicated at 12 of the invention. The beam 11 is part of the frame of a plow which may have a plurality of plow bottoms each being attached to a horizontal beam by a combined guide, holding and release assembly.

Plow bottom 10 has a conventional moldboard 13 and a share 14 terminating in a forward point 16. As shown in FIGURE 1, the plow bottom 10 is positioned in the ground working position in soil 17. Forward movement of plow bottom 10 forms a furrow having a bottom or floor 18. The moldboard 13 and share 14 are connected to an upwardly projecting standard 19. As shown in FIGURE 4, the combined guide, holding and release assembly 12 allows the plow share 14 to swing rearwardly and upwardly out of the ground in an arcuate direction so that the point 16 of the plow share does not go below the plowing depth or furrow bottom 18 when the plow share strikes a fixed object 21, as a stone or rock. The assembly 12 allows the standard 19 to yield in the amount necessary for the plow share 14 to clear obstruction 21. After the share 14 has passed over the obstruction 21 the plow bottom is automatically returned to its normal earth working position as shown in FIGURE 1. This is accomplished without stopping or reversing the forward movement of the plow.

The combined guide, holding and release assembly 12 has a frame including a pair of upright plates 22 and 23 secured to the rear portion of beam 11 by transverse nut and bolt assemblies 24. As shown in FIGURES 2 and 3, a first pair of upright arcuate track members or rails 26 and 27 are located on the inside of the rear section of plate 22 to form an upright arcuate curved guideway 28. Bolts 29 secure track members 26 and 27 to plate 22. A second pair of track members 30 and 31 secured to the inside of the rear portion of plate 22 by bolts 32 form an upright arcuate guideway 33 identical with and facing guideway 28. Guideways 28 and 33 curve in a forward direction. Located in the guideways 28 and 33 are rollers 34 and 36 respectively mounted on a transverse pin 37 projected through the standard 19. Rollers 34 and 36 move along track members 26, 27 and 30, 31 directing the movement of the standard 19 and plow bottom 10.

Extended transversely through plates 22 and 23 adjacent the bottoms of guideways 28 and 33 is a stop 38 engageable with a portion of the standard 19 locating the plow bottom in the normal earth working position. Stop 38 is an adjustable eccentric permitting the plow bottom to be adjusted to vary the suction of share 14.

As shown in FIGURES 2 and 5, a pair of rearwardly directed arms 39 and 41 are positioned between plates 22 and 23 adjacent opposite sides of the upper end of standard 19. The forward ends of arms 39 and 41 are secured to a transverse sleeve 42 mounted on a pivot shaft 43. A bolt 44 secures sleeve 42 to the shaft so that arms 39 and 41 rotate with shaft 42. Splines or keys may be used in place of bolt 44. A transverse pin 46 extends through suitable holes in the opposite ends of arms 39 and 41 and a hole in the upper end of standard 19 to pivotally connect the standard to the arms 39 and 41. The arms 39 and 41 pivotally link the upper end of the standard to the plates 22 and 23. Outwardly directed sleeve bearings 47 and 48 secured to plates 22 and 23 rotatably mount the pivot shaft 43 so that the shaft 43 along with the arms 39 and 41 form a bell crank used to exert a downward force on standard 19.

Shaft 43 has an outward extension 49 carrying a sleeve 51. A torsion coil spring 52 telescoped over sleeve 51 has an end 53 located in an anchor 54 secured to the top of plate 23. The opposite end 56 of spring 52 fits into an opening formed by a semi-circular member 57 secured to sleeve 51 so that rotation of the sleeve 51 will vary the torsion force of spring 52. The outer end of sleeve 51 is secured to a radially directed arm 58 located adjacent a partial disc 59 secured to the end of shaft 43. Partial disc 59 has a plurality of circumferentially spaced holes 51, shown in FIGURE 1, for selectively accommodating a nut and bolt assembly 62 used to attach the arm 58 to disc 59. The rotational force of spring 52 is transmitted to the shaft 43 and arms 39 and 41 yieldably holding the standard 19 against stop 38. The torsional force of spring 52 may be varied by selectively positioning the nut and bolt assembly 62 in one of the holes 61 and rotating the arm 58 in alignment with the selected hole. A suitable handle or extension, as a pipe, may be used to increase the leverage on arm 58 enabling the adjustments to be quickly and easily made.

The torsional force of spring 52 rotates shaft 43 in a clockwise direction, shown in FIGURE 3 by arrow 63, forcing the standard 19 in a downward direction against the stop 38. In this position the standard holds the plow bottom 10 in the normal earth working position.

The centers of the arcs of the guideways 28 and 33 lay along the transverse axis of shaft 43. This axis is above the beam 11 and stop 38. As shown in FIGURES 1 and 3, when standard 19 is in engagement with stop 38 arms 39 and 41 are at a slight upwardly directed angle with respect to the horizontal so that when the plow bottom strikes an obstruction 21 the standard 19 as well as the arms 39 and 41 move upwardly as indicated by arrow 64 in FIGURE 4. On initial contact of the obstruction 21 the point 16 of the plow bottom will move upwardly and rearwardly riding over the obstruction. At no time will the point dig below the furrow bottom 18. The upward movement of standard 19 is against the biasing action of the torsion spring 52 and along the path dictated by the guideways 28 and 33 coupled with the rotational arc of the arms 39 and 41. This movement results in a smooth acting release placing a minimum of stresses on the entire assembly 12. In addition, the tripping and resetting of a plow bottom does not affect other plow bottoms forming part of the entire plow.

While there have been shown and described a preferred embodiment of the invention it is to be understood that various changes and substitutions and details in the plow including but not limited to the frame, the guide structure and the biasing means may be made by those skilled in the art without departing from the spirit of the invention. The term earth working implement includes a moldboard plow, a digger, a stubble plow, a middle buster, a cultivator, a harrow and like earth working tools. The invention is defined in the following claims.

The embodiments of the invention in which an exclusive property or privilege is claimed are defined as follows:

1. In an earth working implement having a beam the combination of: a generally upright movable standard, a frame having a pair of upright plates secured to the beam, stop means engageable with said standard, an earth working tool mounted on the lower section of the standard, said earth working tool located in a ground working position when the standard is in engagement with the stop means, coacting guide means on said standard and frame for directing movement of the standard upwardly away from the stop means without allowing the tool to go below the bottom level of the ground working position, said guide means comprising arcuate pairs of upright guide members forming facing guideways secured to the plates, rollers located in the guideways, and pin means carrying the rollers secured to the standard, rearwardly directed arm means pivotally connected to the upper end of the standard, shaft means rotatably mounted on plates locating the arm means between the plates, said arm means being fixedly secured to the shaft means for angular movement therewith, and means connected to the shaft means for biasing the arm means in a downward direction yieldably holding the standard in engagement with the stop means.

2. The implement structure of claim 1 wherein the biasing means includes a member storing energy.

3. The implement structure of claim 1 wherein the shaft means is a transverse shaft rotatably mounted on the plates forwardly of the upper end of the standard, sleeve means mounting the arm means on the shaft whereby rotation of the shaft angularly moves the arm means, said biasing means acting on the shaft to yieldably hold the arm means in a down position urging the standard against the stop means.

4. The implement structure of claim 3 wherein the biasing means is a torsion spring.

5. In an earth working implement the combination of: a generally upright standard, a frame, stop means engageable with said standard, an earth working tool mounted on the lower section of the standard, said earth working tool located in a ground working position when the standard is in engagement with the stop means, coacting guide means on said standard and frame for directing movement of the standard upwardly away from the stop means without allowing the tool to go below the bottom level of the ground working position, rearwardly directed arm means pivotally connected to the upper end of the standard and the frame, torsion spring means for biasing the arm means in the downward direction yieldably holding the standard in engagement with the stop means, a transverse shaft rotatably mounted on the frame forwardly of the upper end of the standard, means mounting the arm means on the shaft whereby rotation of the shaft angularly moves the arm means, said torsion spring means acting on the shaft to yieldably hold the arm means in the down position urging the standard against the stop means, a first member mounted on the shaft carrying the spring, a second member secured to the shaft and means connecting the first member with a second member for adjusting the force of the spring.

6. The implement structure of claim 5 including an arm projected from the first member for rotating the first member relative to the second member to change the biasing force of the torsion spring.

7. The implement structure of claim 5 including a forwardly directed beam secured to the frame below the transverse shaft.

8. The implement structure of claim 1 wherein the shaft means is a transverse shaft rotatably mounted on the plates forwardly of the upper end of the standard, means mounting the arm means on the shaft whereby rotation of the shaft angularly moves the arm means, said biasing means acting on the shaft to yieldably hold the arm means in the down position urging the standard against the stop means, said guideways having an arcuate center of curvature generally along the axis of the transverse shaft.

9. The implement of claim 1 wherein the earth working tool is a plow bottom.

10. The implement of claim 1 wherein the guide means have centers of curvature generally along the axis of said shaft means.

11. In an earth working implement having a beam the combination of: a generally upright movable standard, a pair of upright plates located on opposite sides of the standard and secured to the beam, a pair of upright curved guide members forming facing guideways secured to the insides of the plates, roller means mounted on the standard and located in the guideways for directing movement of the standard upwardly without allowing the tool to go below the normal ground working position, generally horizontal arm means pivotally connected to the upper end of the standard, said arm means extended in a forward direction between said plates, transverse pivot means pivotally connecting the forward end of the arm means to the plates, and continuous biasing means connected to the arm means applying a continuous biasing force on the arm means in a downward direction to yieldably hold the movable standard and earth working tool in the normal ground working position so that when the ground working tool strikes an obstruction, the standard is moved upwardly and simultaneously rotates backwardly so that the ground working tool does not go below the working depth against the continuous biasing force on the arm means and is automatically returned to the ground working position by the continuous biasing force on the arm means on clearing the obstruction, said continuous biasing means being the sole means holding the movable standard in its ground working position.

References Cited

UNITED STATES PATENTS

| | | | |
|---|---|---|---|
| 548,638 | 10/1895 | Hedges et al. | 172—266 |
| 3,032,122 | 5/1962 | Geurts | 172—264 |

ANTONIO F. GUIDA, Primary Examiner

STEPHEN C. PELLEGRINO, Assistant Examiner

U.S. Cl. X.R.

172—705